United States Patent
Luo (10) Patent No.: US 11,365,846 B2
(45) Date of Patent: Jun. 21, 2022

(54) ROTATION MECHANISM

(71) Applicant: Tymphany Acoustic Technology Limited, Taipei (TW)

(72) Inventor: Yubin Luo, Taipei (TW)

(73) Assignee: TYMPHANY ACOUSTIC TECHNOLOGY LIMITED, Taipei (TW)

( * ) Notice: Subject to any disclaimer, the term of this patent is extended or adjusted under 35 U.S.C. 154(b) by 0 days.

(21) Appl. No.: 17/070,354

(22) Filed: Oct. 14, 2020

(65) Prior Publication Data

US 2021/0247023 A1 Aug. 12, 2021

(51) Int. Cl.
*F16M 13/02* (2006.01)

(52) U.S. Cl.
CPC .................................. *F16M 13/022* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,555,302 | A * | 9/1996 | Wang | B60R 11/0241 379/426 |
| 10,760,732 | B1 * | 9/2020 | Koh | H04B 1/3888 |
| 2003/0156836 | A1 * | 8/2003 | Ward | F16M 13/00 396/419 |
| 2010/0230555 | A1 * | 9/2010 | Edinger | F16M 11/041 248/104 |
| 2016/0018051 | A1 * | 1/2016 | Lin | F16M 11/2021 248/122.1 |
| 2019/0154190 | A1 * | 5/2019 | Yun | F16M 11/105 |
| 2020/0400268 | A1 * | 12/2020 | Yang | F16M 11/40 |

FOREIGN PATENT DOCUMENTS

GB 2464352 A * 4/2010 ........... F16M 11/105

* cited by examiner

*Primary Examiner* — Monica E Millner
(74) *Attorney, Agent, or Firm* — Muncy, Geissler, Olds & Lowe, P.C.

(57) ABSTRACT

A rotation mechanism having a positioning function includes a rotary base, a rotary set rotatably arranged on the rotary base, a securing set mounted on the rotary set for adjusting a spacing between the rotary set and the rotary base, and an elastic set mounted between the securing set and the rotary set and butted against by the securing set for providing an elastic force. The rotary case includes a fix pin extending from the rotary base and a first slide portion portion disposed on the rotary base and configured around the fix pin. The rotary set includes a second slide portion correspondingly engaged with the first slide portion, and a first opening used for receiving the fix pin and allowing the rotary set being rotated relative to the rotary base.

14 Claims, 6 Drawing Sheets

ROTATION MECHANISM

CROSS REFERENCE TO RELATED APPLICATIONS

The present application claims priority to Chinese Patent Application No. CN 202020157576.X, which was filed on Feb. 10, 2020, the entire contents of which are hereby incorporated by reference.

BACKGROUND

Technical Field

The present invention relates to a rotation mechanism, particularly, a rotation mechanism providing multi-directional lockable positions.

Related Art

It is common to see a brand logo imposed on the appearance of a commercial electronic product, such as audio playback devices, so that general consumers can clearly distinguish the sources of a product. As for certain products, they are designed to be freely placed in various positions with different angles, i.e., vertical or horizontal positions, but the brand logo position is usually fixed and is unable to be freely changed and easily recognized by the consumers.

To solve the foregoing problem, it is imperative to design a solution of better rotation mechanism in the art of electronic products to freely position the brand logo position, so as to provide a better user experience.

SUMMARY

The present invention provides a rotation mechanism having a positioning function. This rotation mechanism comprises a rotary base, a rotary set arranged on the rotary base, a securing set mounted on the rotary set for adjusting a spacing between the rotary set and the rotary base, and an elastic set mounted between the securing set and the rotary set and butted against by the securing set for providing an elastic force. The rotary case includes a fix pin extending from the rotary base and a first slide portion disposed on the rotary base and configured around the fix pin. The rotary set includes a second slide portion correspondingly engaged with the first slide portion, and a first opening used for receiving the fix pin and allowing the rotary set being rotated relative to the rotary base. Further, the engagement between the first slide portion and the second slide portion is at a predetermined first position. The rotary base rotates relative to the rotary set, and overcomes elastic force provided by the elastic set. Then, the first slide portion slides relative to the second slide portion, and the spacing between the rotary set and the rotary base increases. After the engagement between the first slide portion and the second slide portion is away from the first predetermined position, the elastic force from the elastic set increases due to the compression, and forces the first slide portion engaged with the second slide portion movable at a second predetermined position.

In another embodiment, the first slide portion and the second slide portion each have a plurality of gear teeth, and a number of the plurality of gear teeth corresponds to position angles of the rotary base related to the rotary set.

In another embodiment, the rotation mechanism further comprises a housing mounted between the rotary base and the rotary set has a fitting hole for allowing the fix pin passing there through.

In another embodiment, the housing includes a pair of locating fins located at two sides of the fitting hole for the fix pin, and the pair of locating fins is used for locating a relative position between the rotary set and the housing.

In another embodiment, the rotary set has a third slide portion disposed on the rotary set opposite to the second slide portion.

In another embodiment, the rotation mechanism further comprises a rotary cover sleeved on the rotary set and being elastically abutted against by the elastic set. The rotary cover is rotatable relative to the rotary set and has a fourth slide portion at a side of the rotary cover corresponding to the rotary set. The fourth slide portion engages with the third slide portion of the rotary set. Further, the engagement between the third slide portion and the fourth slide portion is at a predetermined third position. The rotary set rotates relative to the rotary cover, and overcomes elastic force provided by the elastic set. Then, the third slide portion slides relative to the fourth slide portion, and the spacing between the rotary set and the rotary cover increases. After the engagement between the third slide portion and the fourth slide portion is away from the third predetermined position, the elastic force from the elastic set increases due to the compression and forces the third slide portion engaged with the fourth slide portion movable at a fourth predetermined position.

In another embodiment, the rotary cover has a second opening for allowing the fix pin of the rotary set to pass there through.

In another embodiment, the elastic set has one end abutted against the rotary cover corresponding to the fourth slide portion, and the other end abutted against a flange of the securing set.

In another embodiment, the first slide portion, the second slide portion, the third slide portion and the fourth slide portion each have a plurality of ratchet teeth. A number of the plurality of ratchet teeth of the first and second slide portions corresponds to a position angle of the rotary base related to the rotary set. A number of the plurality of ratchet teeth of the third and fourth slide portions corresponds to a position angle of the rotary set related to the rotary cover.

In another embodiment, each of the plurality of ratchet teeth have an inclined surface provided for sliding and a vertical surface provided for abutting and non-slide.

In another embodiment, each of the plurality of ratchet teeth of the first, second, third and fourth sliding portions has an anchor structure formed on the inclined surface or an anchor slot corresponding to the anchor structure.

Based on the above technical solutions, the rotation mechanism of the present invention is able to provide a function of rotation movements in multiple positional angles, and to improve usability of objects.

BRIEF DESCRIPTION OF THE DRAWINGS

The present invention will become more fully understood from the detailed description given herein below and the accompanying drawings which are given by way of illustration only, and thus, do not limit the present invention, and wherein.

DETAILED DESCRIPTION

For easy understanding, the meanings of "upper", "lower", "left", and "right" according to the drawings is to indicate the relative position of the reference between the components, not to limit the application.

Figure 1:
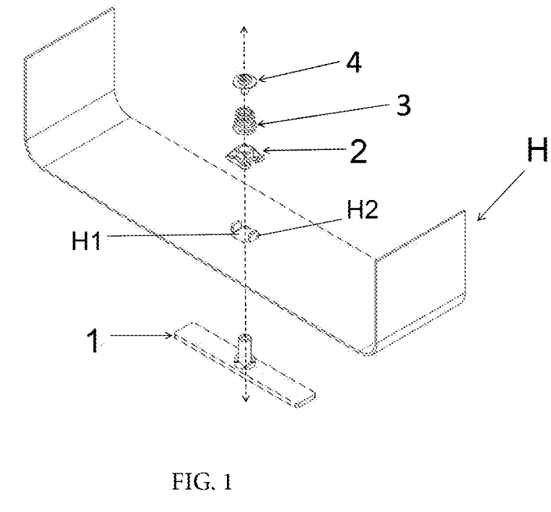
FIG. 1 is a schematic perspective exploded view of the first embodiment of a rotation mechanism of the present invention.

Referring to FIG. 1, FIG. 1 is a perspective exploded schematic view of the first embodiment of a rotation mechanism of the present invention. As shown in FIG. 1, the rotation mechanism passes through and and is assembled with a housing H, which has a fitting hole H1 defined therein. The rotation mechanism includes a rotary base 1, a rotary set 2, an elastic set 3, and a securing set 4, wherein the rotary set 2 passes through an external surface of the housing H, and the rotary base 1, elastic set 3 and securing set 4 are mounted in an internal surface of the housing H.

Figure 2:
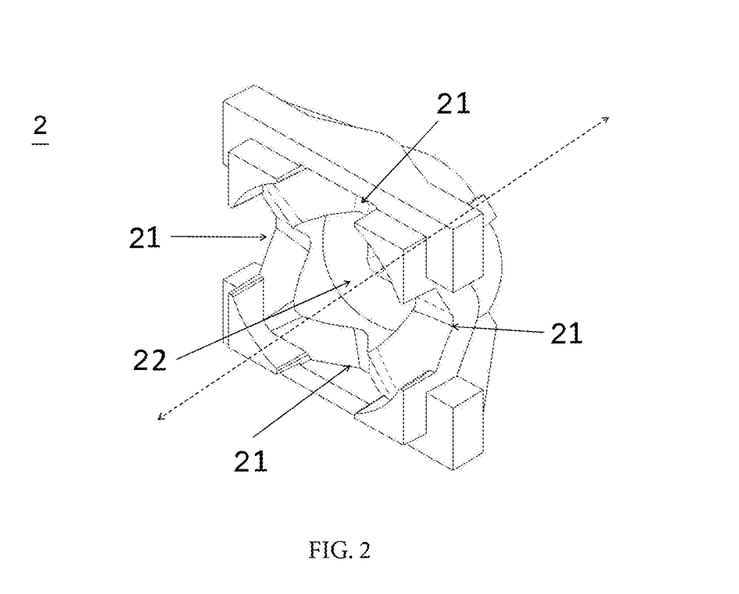
FIG. 2 is a schematic perspective view of the first embodiment in accordance with the rotation mechanism of the present invention.
Figure 3:
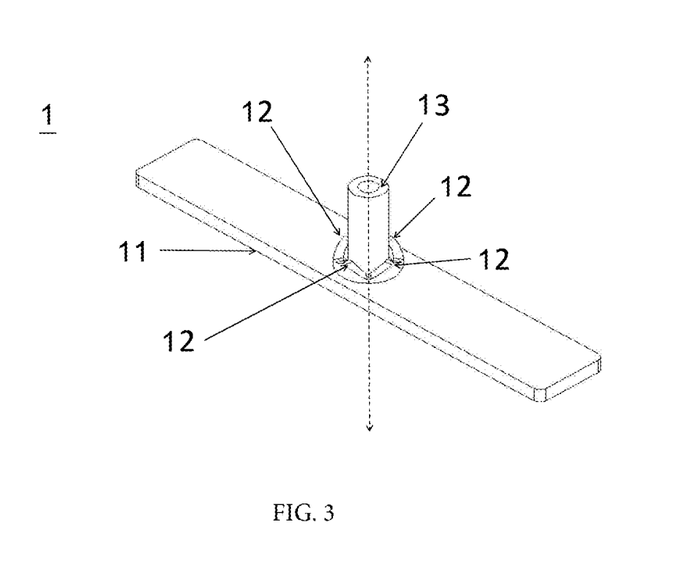
FIG. 3 is an assembled schematic perspective view of the first embodiment in accordance with the rotation mechanism of the present invention.

FIGS. 2-3 show schematic perspective views of a rotation mechanism assembly in accordance with the rotation mechanism of the present invention. As shown in FIG. 3, the rotary base 1 includes a rotating portion 11, a plurality of first slide portions 12, and a fix pin 13. The rotating portion 11 is exposed from the external surface of the housing H when the rotation mechanism is assembled with the housing. The rotating portion 11 has a structure of a base plate, which can be and is not limited to being round, oval, triangle, rectangle or other polygon. In the present embodiment, the base plate of the rotating portion 11 is rectangular as shown in FIG. 3. Each first slide portion 12 is a gear teeth structure composed of two inclined faces and is protruded from the base plate of the rotary base 1. The number and shapes of first slide portions 12 corresponds to those of the second slide portions 21 of the rotary set 2. That is, the number of first slide portions 12 corresponds to the number of position angles of the rotation mechanism. The shapes of the first slide portions 12 correspond to the gear teeth structure of the second slide portion 21, so that the first slide portions 12 are able to match the second slide portions 21 while they are engaged with each other. The fix pin 13 is a hollow cylinder in a shape and size corresponding to those of a first opening 22 of the rotary set 2. When the rotary base 1 is assembled with the rotary set 2, the fix pin 13 is passed through the first opening 22, so that the first slide portions 12 of the rotary base 1 match and are engaged with the second slide portions 21 of the rotary set 2.

As shown in FIG. 2, the rotary set 2 of the first embodiment includes a plurality of second slide portions 21 and the first opening 22. Each second slide portion 21 is a gear tooth structure composed of two inclined faces and is protruded from one side of the rotary set 2. The number of second slide portions 21 and their positions are designed per the user's requirements. For example, the rotation mechanism is designed to have three position angles, central angles at 0, 120, and 240 degrees. The number of second slide portions 21 is three, which are position angles, and are respectively at the central angles 0, 120, and 240 degrees, so that the number of second slide portions 21 fit the number of position angles of the rotation mechanism. In this embodiment, the number of second slide portions 21 is four as an example, but it is not limited thereto. Further, the plurality of second slide portions 21 are formed as a continuous concaved surface by extending the multiple inclined surfaces thereof. The first opening 22 passes through the rotary set 2. The plurality of second slide portions 21 is disposed around the first opening 22.

The elastic set 3 can be a spring or other elastic components. In this embodiment, the elastic set 3 is a coil spring as an example, but it is not limited thereto. The securing set 4 can be a screw or other components with securing function. In this embodiment, the securing set 4 is a screw as an example, but it is not limited thereto. The fix pin 13 is hollow and has an inner threaded surface with corresponsive to the securing set 4.

Furthermore, the housing H includes a pair of locating fins H2 at two sides of the fitting hole H1 for fixing the relative position between the rotary set 2 and the housing H.

Referring to FIG. 1, the rotation set 2 is mounted on the internal surface of the housing H. The first opening 22 corresponds to the fitting hole H1 of the housing H. The fix pin 13 of the rotary base 1 passes through the fitting hole H1 of the housing H as well as the first opening 22, so that the rotating portion 11 is mounted on the external surface of the housing H. In the meanwhile, the second slide portion 21 of the rotary set 2 and the first slide portion 12 of the rotary base 1 are engaged with each other. The elastic set 3 is sleeved on the fix pin 13 which is extended from the first opening 22, and thus one end of the elastic set 3 is connected to the rotary set 2. The other end of the elastic set 3 is abutted against the securing set 4 when the securing set 4 is secured on the fix pin 13. The securing set 4 is secured to and compressively abutted against the other end of the elastic set 3, so that the elastic set 3 is in a compressed state and one end of the elastic set 3 is further abutted against the rotary set 2. This makes the rotary set 2, rotary base 1 and the housing stably assembled. When the first slide portion 12 of the rotary base 1 rotates relative to the second slide portion 21 and is moved to engage with a next second slide portion 21, the rotary set 2 is moved away from the internal surface of the housing H because of the continuous concave surface of the second slide portions 21. At that time, the elastic set 3 is further compressed and provides an elastic restore force so as to rotate the first slide portion 12 of the rotary set 2 to the next second slide portion 21, and then back to the stable position.

Moreover, in another embodiment, the surfaces of the second slide portions 21 and the first slide portions 12 are twisted surfaces facing the first opening 22 of the rotary set 2 and the fix pin 13 of the rotatory base 1, not parallel to each other. Thus, the surfaces of the second slide portions 21 and the first slide portions 12 are completely contacted when the second slide portion 21 is rotated relative to the first slide portion 12, so as to avoid the abrasion between the second slide portion 21 and the first slide portion 12.

Figure 4:
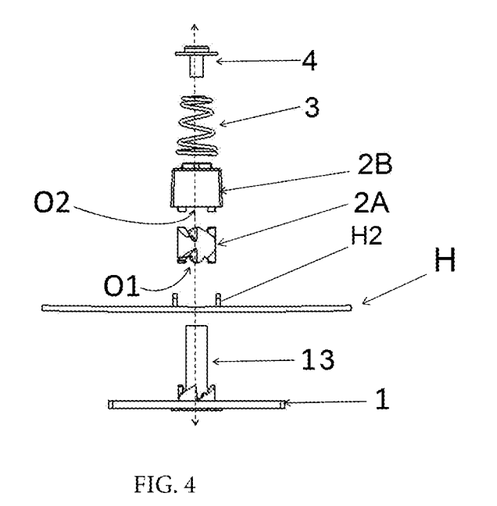
FIG. 4 is a schematic perspective exploded view of the second embodiment in accordance with the rotation mechanism of the present invention.
Figure 5:
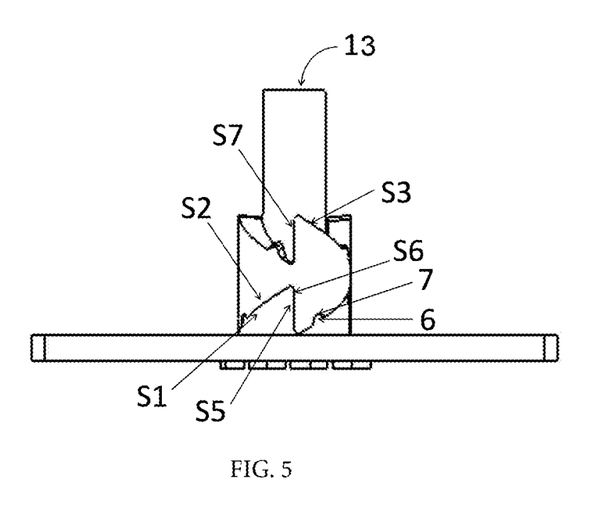
FIG. 5 is an assembled schematic side view of the second embodiment in accordance with the rotation mechanism of the present invention.
Figure 6:
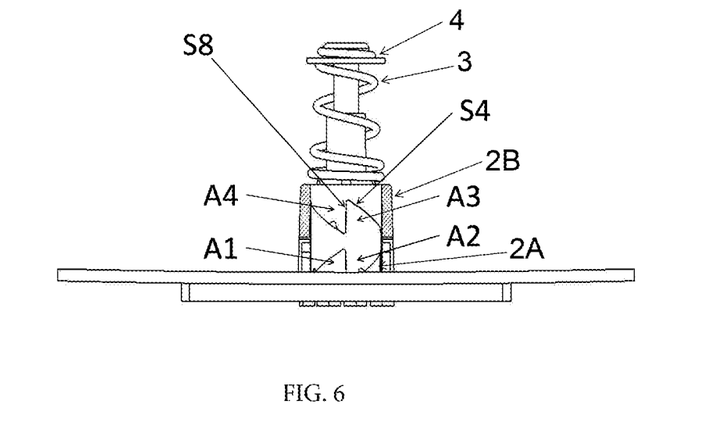
FIG. 6 is a schematic cross-sectional view of the second embodiment in accordance with the rotation mechanism of the present invention.

In a second embodiment of the present invention, as show in FIGS. 4-6, FIG. 4 is a schematic perspective exploded view of the second embodiment in accordance with the rotation mechanism of the present invention, FIG. 5 is a schematic perspective view of the second embodiment in accordance with the rotation mechanism of the present invention and FIG. 6 is a schematic cross-section view of the second embodiment in accordance with the rotation mechanism of the present invention. The rotation mechanism comprise a rotary base 1, a rotary set 2A, a rotary cover 2B, an elastic set 3 and a securing set 4. The rotary base 1 passes through the external surface of the housing H. The rotary set 2A, rotary cover 2B, elastic set 3 and securing set 4 are mounted on the internal surface of the housing H.

The rotary base 1 includes a plurality of first slide portions A1 and a fix pin 13. The fix pin 13 extends from one side of the rotary base 1. The plurality of first slide portions A1 is disposed on one side of the rotary base 1 and configured around the fix pins 13. As shown in FIG. 5, each first slide portion A1 has a ratchet tooth with two inclined sides, which are one inclined surface S1 and the other vertical surface S5. The slope of the inclined surface in the second embodiment is more steep that the first embodiment. One end of the fix pin 13 away from the rotary base 1 has a thread for securing the securing set 4.

The rotary set 2A is a hollow cylinder divided into three parts, two end parts and a hollow middle part. A first opening O1 is the hollow middle part and is defined through the rotary set 2A. One end of the rotary set 2A has a plurality of second slide portions A2 with inclined surfaces S2; the other end of the rotary set 2A has a plurality of third slide portions A3 with inclined surfaces S3. When assembling the rotary set 2A with the rotary base 1, the rotary set 2A is sleeved on the fix pin 13 through the first opening O1, so that the second slide portion A2 engages with the first slide portion A1, namely the inclined surface S1 of the first slide portion A1 completely matches to the inclined surface S2 of the second slide portion A2.

The rotary cover 2B is a block-like component having two free ends. A second opening O2 is passed through the two ends of the rotary cover 2B. One end of the rotary cover 2B is configured to form a plurality of fourth slide portions A4 with inclined sliding surface S4. When assembling the rotary cover 2B with the rotary base 1, the second opening O2 is sleeved on the fix pin 13, so that the fourth slide portion A4 engages with the third slide portion A3, namely the sliding surface S3 of the third slide portions A3 are completely match with the sliding surface S4 of the fourth slide portion A4.

In another embodiment, the inclined sliding surfaces S1, S2, S3, and S4 are inclined planes. The slopes of the inclined surfaces S1 and S2 are the same. The slopes of the inclined surfaces S3 and S4 are the same. The slope of the inclined surface S1 is opposite to that of the inclined surface S3. In another embodiment, the inclined surfaces S1, S2, S3, and S4 are concave surfaces. Similarly, the inclined surfaces S1 and S2 are parallel and the inclined surfaces S3 and S4 are parallel, and the slopes of the inclined surfaces S1 and S2 are opposite (vertical) to those of the inclined surfaces S4 and S5.

The elastic set 3 is sleeved on the fix pin 13. One end of the elastic set 3 is abutted by the rotary cover 2B. In another embodiment, the elastic set 3 can be a coil spring, it is not limited thereto, or be any hollow elastic component. The securing set 4 is fastened on the fix pin 13 and butted against one end of the elastic set 3 opposite to the rotary cover 2B, so as to avoid the rotary set 2A, rotary cover 2B and the fix pin 13 releasing from the fix pin 13. In another embodiment, the fix pin 13 can be and is not limited to a screw, a rivet or any other securing component. The fix pin 13 has a corresponsive securing structure to the securing set 4.

Further, the first slide portion A1, second slide portion A2, third slide portion A3, and fourth slide portion A3 each have a plurality of ratchet teeth. Each of the plurality of ratchet teeth has an inclined surface provided for sliding and a vertical surface (S5, S6, S7, and S8) provided for abutting and being non-slide. Each vertical surface is located between two inclined surfaces, which forms a profile of unidirectional ratchet teeth. When the first slide portion A1 engages with the second slide portion A2, the inclined surface S1 completely matches with the inclined surface S2; the vertical surface S5 completely matches with the vertical surface S6. Thus, the rotary base 1 is rotated relative to the rotary set 2A in clockwise through the inclined surfaces S1 and S2. On the contrary, while the first slide portion A1 is attempted to rotate relative to the second slide portion A2 in counterclockwise, it is unable to move because the vertical surfaces S5 and S6 are engaged and abutted against each other. The rotation between first and second slide portions A1 and A2 is unidirectional.

Similarly, when the third slide portion A3 is engaged with the fourth slide portion A4, the inclined surface S3 completely matches with the inclined surface S4 and the vertical surface S7 completely matches with the vertical surface S8, so that the rotary set 2A is rotated relative to the rotary cover 2B in counterclockwise through the inclined surfaces S3 and S4. On the contrary, while the third slide portion A3 is attempted to rotate relative to the fourth slide portion A4 in a revered clockwise, it is unable to operate because the vertical surfaces S7 and S8 are engaged and abutted against each other. The rotation between third and fourth slide portions A3 and A4 is unidirectional.

With the assembly of the rotation mechanism and the housing H, the user can rotate the rotary base 1 in clockwise. The rotation of rotary base 1 can be rotated via the first and second inclined surfaces S1 and S2. The vertical surfaces S5 and S6 are engaged and abutted against each other to cause no rotation of rotary set 2A relative to rotary cover 2B. When the inclined surface S1 is slid relative to the inclined surface S2, the rotary base 1 is fixed on the housing H and is lifted up relative the rotary set 2A by the inclined surfaces S1 and S2, and the rotary cover 2B is abutted against and pushed the elastic set 3. The other end of the elastic set 3 is abutted by the securing set 4, such that a length of elastic set 3 is compressed. During the clockwise rotation of the rotary base 1, the first slide portion A1 is initially engaged with the second slide portion A2 and is slidably moved d to the adjacent second slide portion A2 in clockwise orient, so that the inclined surface S1 complete matches with the inclined surface S2 of the second slide portion A2. Because the elastic set 3 is compressed during the rotation, an elastic resilience is accordingly generated to stably press the first slide portion A1 engaged with an adjacent (next) second slide portion A2 after aforesaid rotation.

On the contrary, when the user rotates the rotary base 1 in counterclockwise, it is unable to rotate the rotary base 1 relative to the rotary set 2A since the vertical surface S5 of rotary base 1 is abutted against the vertical surface S6 of rotary set 2A. In meanwhile, the rotary set 2A is able to be rotated related to the rotary cover 2B in counterclockwise orient through a geared movement between the third and fourth inclined surfaces S3 and S4. Because the rotary set 2A is abutted against the rotary base 1 during the counterclockwise rotation, the rotary set 2A rotates in the same direction as the rotary base 1. The third slide portion A3 is initially engaged at a fourth slide portion A4 and then slides to an adjacent (next) fourth slide portion A4 in counterclockwise orient. Similarly, when the inclined surface S3 matches with the inclined surface S4 of the fourth slide portion A4, the elastic set 3 provides an elastic resilience to stably press the third slide portion A3 engaged with an adjacent (next) fourth slide portion A4 after aforesaid rotation.

In another embodiment, the inclined surfaces S1 and S3 each has an anchor structure 6 protruding from the inclined surfaces S1 and S3. The anchor structure 6 can be any protrusion, but not limited hereto, like a round protrusion or a curved protrusion. The inclined surfaces S2 and S4 each has an anchor slot 7 corresponding to the anchor structure 6. The engagement of inclined surfaces S1 and S2 (or S3 and S4) can be more stable by further engaging the anchor structure 6 with the anchor slot 7, so as to avoid any undesired slipping rotation.

Based on the above technical solutions, the rotation mechanism of present invention is able to provide a function of rotation movements in multiple positional angles, and to improve usability of objects.

Although this application has been disclosed above in the embodiments, they are not intended to limit this application. A person skilled in the art can make various variations and modifications to this application without departing from the spirit and scope of this application. Therefore, the protection scope of this application is subject to the appended claims.

What is claimed is:

1. A rotation mechanism, comprising:
 a rotary base comprising:
  a fix pin extending from the rotary base; and
  a first slide portion disposed on the rotary base and configured around the fix pin;
 a rotary set arranged on the rotary base, the rotary set comprising:
  a second slide portion engaged with the first slide portion; and
  a first opening configured to receive the fix pin and allow the rotary set to rotate relative to the rotary base;
 a securing set mounted on the rotary set for adjusting a spacing between the rotary set and the rotary base;
 an elastic set mounted between the securing set and the rotary set and butted against by the securing set for providing an elastic force; and
 a housing mounted between the rotary base and the rotary set, wherein the housing has a fitting hole configured to allow the fix pin to pass there through.

2. The rotation mechanism according to claim 1, wherein the first slide portion and the second slide portion each have a plurality of gear teeth, and a number of the plurality of gear teeth corresponds to position angles of the rotary base with respect to the rotary set.

3. The rotation mechanism according to claim 1, wherein the housing includes a pair of locating fins located at two sides of the fitting hole, and
 wherein the pair of locating fins is configured to locate a relative position between the rotary set and the housing.

4. The rotation mechanism according to claim 1, wherein the rotary set has a third slide portion disposed on the rotary set opposite to the second slide portion.

5. The rotation mechanism according to claim 4, further comprising:
 a rotary cover sleeved on the rotary set and being elastically abutted against by the elastic set, the rotary cover configured to rotate relative to the rotary set; and
 a fourth slide portion at a side of the rotary cover corresponding to the rotary set, the fourth slide portion being engaged with the third slide portion of the rotary set.

6. The rotation mechanism according to claim 5, wherein the rotary cover has a second opening for allowing the fix pin of the rotary base to pass therethrough.

7. The rotation mechanism according to claim 5, wherein the elastic set has one end abutted against the rotary cover corresponding to the fourth slide portion, and an other end abutted against a flange of the securing set.

8. The rotation mechanism according to claim 5, wherein the first slide portion, the second slide portion, the third slide portion and the fourth slide portion each have a plurality of ratchet teeth,
 wherein a number of the plurality of ratchet teeth of the first slide portion and the second slide portion corresponds to a position angle of the rotary base with respect to the rotary set, and
 a number of the plurality of ratchet teeth of the third slide portion and the fourth slide portion corresponds to a position angle of the rotary set with respect to the rotary cover.

9. The rotation mechanism according to claim 8, wherein each of the plurality of ratchet teeth has an inclined surface provided for sliding and a vertical surface provided for abutting.

10. The rotation mechanism according to claim 9, wherein each of the plurality of ratchet teeth of the first slide portion, the second slide portion, the third slide portion and the fourth slide portion has an anchor structure formed on the inclined surface or an anchor slot corresponding to the anchor structure.

11. The rotation mechanism according to claim 1, wherein the rotary base comprises a rotating portion having a structure of a base plate, the rotating portion is mounted on the external surface of the housing, and the rotation set is mounted on the internal surface of the housing.

12. The rotation mechanism according to claim 2, wherein each of the plurality of gear teeth of the first slide portion has two inclined faces and is protruded from a base plate of the rotary base, and each of the plurality of gear teeth of the second slide portion has two inclined faces and is protruded from one side of the rotary set.

13. The rotation mechanism according to claim 1, wherein the fix pin is hollow and one end thereof away from the rotary base has an inner threaded surface with corresponsive to the securing set.

14. The rotation mechanism according to claim 8, wherein the slope of the inclined surface of the ratchet teeth of the first slide portion is opposite to that of the third slide portion.

* * * * *